(12) United States Patent
Vig et al.

(10) Patent No.: US 7,936,144 B2
(45) Date of Patent: May 3, 2011

(54) SELF-CALIBRATION ALGORITHMS IN A SMALL MOTOR DRIVER IC WITH AN INTEGRATED POSITION SENSOR

(75) Inventors: Ravi Vig, Bow, NH (US); Paul David, Bow, NH (US); Shaun D. Milano, Chichester, NH (US); Michael C. Doogue, Manchester, NH (US); David J. Haas, Weare, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 331 days.

(21) Appl. No.: 12/139,539

(22) Filed: Jun. 16, 2008

(65) Prior Publication Data

US 2009/0224716 A1    Sep. 10, 2009

Related U.S. Application Data

(60) Provisional application No. 61/034,341, filed on Mar. 6, 2008.

(51) Int. Cl.
*G05D 23/275* (2006.01)
(52) U.S. Cl. .................. 318/632; 318/562; 318/666
(58) Field of Classification Search .......... 318/632, 318/562, 666, 668, 550, 560, 599, 627, 467, 318/672
See application file for complete search history.

(56) References Cited

U.S. PATENT DOCUMENTS

| | | | |
|---|---|---|---|
| 3,836,835 A | 9/1974 | Sawyer | |
| 3,878,411 A | 4/1975 | Nocito et al. | |
| 4,455,512 A | 6/1984 | Cornwell et al. | |
| 4,456,934 A | 6/1984 | Wedman et al. | |
| 4,527,108 A | 7/1985 | Enda | |
| 4,748,393 A | 5/1988 | Fincher et al. | |
| 4,893,071 A | 1/1990 | Miller | |
| 4,897,582 A | 1/1990 | Otten et al. | |
| 5,289,088 A | 2/1994 | Andoh | |
| 5,389,864 A | 2/1995 | Tryan et al. | |
| 5,801,462 A | 9/1998 | Yagoto et al. | |
| 5,880,586 A | 3/1999 | Dukart et al. | |
| 5,965,963 A | 10/1999 | Chitayet | |

(Continued)

FOREIGN PATENT DOCUMENTS

EP    1855135 A1    11/2007

(Continued)

OTHER PUBLICATIONS

"Using Internal Calibration and Right Shifting (Scalable Dynamic Ranging) on the DS1863/DS1865 to Enhance ADC Performance", Application Note 3903, Maxim Integrated Products, Aug. 18, 2006, 10 pages.

(Continued)

*Primary Examiner* — Karen Masih
(74) *Attorney, Agent, or Firm* — Daly, Crowley, Mofford & Durkee, LLP

(57) ABSTRACT

A motion control device for controlling a motor is presented. The motion control device is operable to scale or adjust an input relative to an input range that is based on calibration values and to use that scaled input to produce a drive signal to drive the motor. The motion control device performs a self-calibration to produce the calibration values. The self-calibration involves measuring home position and full travel position values for the motor.

21 Claims, 10 Drawing Sheets

U.S. PATENT DOCUMENTS

| | | | |
|---|---|---|---|
| 6,034,499 | A | 3/2000 | Tranovich |
| 6,118,245 | A | 9/2000 | Sienz et al. |
| 6,181,882 | B1 | 1/2001 | Murashima et al. |
| 6,285,154 | B1 | 9/2001 | Yasuda et al. |
| 6,400,046 | B1 | 6/2002 | Hwang et al. |
| 6,404,154 | B2 | 6/2002 | Marcinkiewicz et al. |
| 7,268,515 | B1 | 9/2007 | Tsai et al. |
| 7,288,913 | B2 | 10/2007 | Yoshitomi et al. |
| 7,288,914 | B2 | 10/2007 | Yoshitomi et al. |
| 7,295,907 | B2 * | 11/2007 | Lu et al. ............... 701/41 |
| 7,590,334 | B2 | 9/2009 | Yabusaki et al. |
| 7,747,146 | B2 | 6/2010 | Milano et al. |
| 2002/0034036 | A1 | 3/2002 | Sri-Jayantha et al. |
| 2004/0012682 | A1 | 1/2004 | Kosaka et al. |
| 2007/0047942 | A1 | 3/2007 | Chang et al. |
| 2008/0066548 | A1 | 3/2008 | Jajtic et al. |
| 2008/0130134 | A1 | 6/2008 | Ishida et al. |
| 2008/0265825 | A1 | 10/2008 | Su |

FOREIGN PATENT DOCUMENTS

| | | |
|---|---|---|
| KR | 10-0691245 | 2/2007 |
| WO | WO 2006/049039 A1 | 5/2006 |

OTHER PUBLICATIONS

"New ICs Revolutionize The Sensor Interface", Application Note 695, Maxim Integrated Products, Jan. 10, 2001, 8 pages.

Jacobsen, Eric, "A Cookbook Approach to Designing a Differential-Signal Amplifier for Sensor Applications", AN1557/D, Motorola, Freescale Semiconductor, Inc., 1996, 10 pages.

Gilbert, Joe and Dewey, Ray, "Linear Hall-Effect Sensors", Application Note 27702A, Dec. 3, 1998, 12 pages.

Self-Calibrating TPOS Speed Sensor Optimized for Automotive Cam Sensing Applications, ATS675LSE, Allegro MicroSystems, Inc., 2008, 13 pages.

Self-Calibrating, Zero-Speed Differential Gear Tooth Sensor with Continuous Update, ATS643LSH, Rev. 2, Allegro MicroSystems, Inc., 2004, 2006, 16 pages.

File downloaded for U.S. Appl. No. 11/865,118, filed Oct. 1, 2007, file through Apr. 27, 2009, 122 pages.

File downloaded for U.S. Appl. No. 11/865,118, filed Oct. 1, 2007 Apr. 27, 2009 thru Jul. 15, 2010, 423 pages.

PCT Notification with International Preliminary Report on Patentability dated Apr. 29, 2010 for PCT/US2008/075560 filed on Sep. 8, 2008.

Notification of Transmittal of the International Search Report and the Written Opinion of the International Searching Authority, or the Declaration, PCT/US2008/075560, dated Apr. 8, 2010, 1 page.

International Search Report, PCT/US2008/075560, dated Apr. 8, 2010, 6 pages.

Written Opinion of the International Searching Authority, PCT/US2008/075560, dated Apr. 8, 2010, 10 pages.

Invitation to Pay Additional Fees with Partial Search Report for PCT/US2008/075560, dated Nov. 18, 2009, 5 pages.

Datasheet, Allegro Microsystems, Inc., A3904, "Low Voltage Voice Coil Motor Driver", 2007-2008, 9 pages.

Datasheet, Allegro Microsystems, Inc., A1442, "Low Voltage Full Bridge Brushless DC Motor Driver with Hall Commutation and Soft-Switching, and Reverse Battery, Short Circuit, and Thermal Shutdown Protection", 2005, 2006, 8 pages.

Datasheet, Allegro Microsystems, Inc., A1391, A1392, A1393, and A1395, "Micro Power 3V Linear Hall Effect Sensors with Tri-State Output and User-Selectable Sleep Mode", 2005-2008, 15 pages.

Application Information, Allegro Microsystems, Inc., "Closed-Loop Speed Control for the A3932/A3936", by Peter Todd, Oct. 23, 2003, 5 pages.

Application Information, Allegro Microsystems, Inc., "Fully Integrated Hall Effect Motor Driver for Brushless DC Vibration Motor Applications", by Shaun Milano, 2007, 7 pages.

Notification of Transmittal of the International Search Report and the Written Opinion of the International Searching Authority, or the Declaration, PCT/US2009/031632 dated Oct. 1, 2009.

The International Search Report, PCT/US2009/031632 dated Oct. 1, 2009.

Written Opinion of the International Searching Authority, PCT/US2009/031632 dated Oct. 1, 2009.

Anonymous: "Method for Calibration of Position Servo Devices", IBM Technical Disclosure Bulletin, IBM Corp., New York, US, vol. 26, No. 4, Sep. 1, 1983, pp. 1818-1821, XP002111808, ISSN: 0018-8689.

PCT Notification with International Preliminary Report on Patentability dated Sep. 16, 2010 for PCT/US2009/031632 filed on Jan. 22, 2009, 10 pages.

File downloaded for U.S. Appl. No. 11/865,118, filed Oct. 1, 2007 file from Jul. 15, 2010 thru Nov. 4, 2010, 76 pages.

File downloaded for U.S. Appl. No. 11/865,118, filed Oct. 1, 2007 file from Nov. 4, 2010 through Dec. 6, 2010, 32 pages.

* cited by examiner

SELF-CALIBRATION ALGORITHMS IN A SMALL MOTOR DRIVER IC WITH AN INTEGRATED POSITION SENSOR

CROSS-REFERENCE TO RELATED APPLICATIONS

This application claims priority from U.S. Provisional Patent Application No. 61/034,341, filed Mar. 6, 2008, incorporated herein by reference in its entirety for all purposes.

STATEMENT REGARDING FEDERALLY SPONSORED RESEARCH

Not applicable.

FIELD OF THE INVENTION

This invention relates generally to calibration techniques for motor control.

BACKGROUND OF THE INVENTION

When driving small motors, mechanical tolerances and hysteresis effects, as well as magnetic circuit variations, can cause offset in the motor start-of-travel (or home) position and reduced range of travel. These home position offsets and range of travel limitations vary from motor to motor. Thus, precise linear motion control of such motors may be difficult to achieve without some type of calibration.

In some positioning applications, the microcontroller or processor that issues the drive signal (i.e., position) requests also performs a calibration routine. The calibration routine may use output signal data from a number of different components, including a position sensor, to compensate for offset and range of travel differences. The microcontroller must store and subsequently use the calibration data to compute position request values. This type of calibration requires processing time and an allocation of memory space.

SUMMARY OF THE INVENTION

In general, in one aspect, the invention is directed to a device for controlling a motor. The device includes a driver and a sensor. The device further includes: first circuitry, coupled to the driver and sensor, to control the driver and sensor to produce calibration information for the motor; and second circuitry, coupled to the first circuitry, to adjust an input relative to an input range that is based on the calibration information. The adjusted input is usable to produce a drive signal to drive the motor.

Embodiments of the invention may include one or more of the following features. The calibration information may include a first calibration value corresponding to a start-of-travel position value output by the sensor when the driver provides no current to the motor and a second calibration value corresponding to an end-of-travel position value output by the sensor when the driver provides to the motor a current capable of producing a maximum position change. The second circuitry may include an input interface to receive an input request as the input and the first circuitry may include a calibration control block that provides the first and second calibration values to the input interface. The input request may be a digital value, and the input interface may include a digital-to-analog converter (DAC) having a first reference terminal to receive the first calibration value as a first reference and a second reference terminal to receive the second calibration value as a second reference, the first and second references defining the input range. The driver may be a voice coil driver and the sensor a magnetic field sensor.

In another aspect, the invention is directed to system that includes a controller and a motion control device, coupled to the controller and a voice coil motor (VCM). The motion control device includes a voice coil driver and a magnetic field sensor. The motion control device further includes: first circuitry, coupled to the voice coil driver and the magnetic field sensor, to control the voice coil driver and magnetic field sensor to produce calibration information for the VCM; and second circuitry, coupled to the first circuitry, to adjust an input relative to an input range that is based on the calibration information. The adjusted input is usable to produce a drive signal to drive the VCM.

Embodiments of the invention may include one or more of the following features. The controller may be configured to use the motion control device to focus the lens of a camera. The voice coil driver, the magnetic field sensor, the first circuitry and the second circuitry may be integrated as a semiconductor integrated circuit. The semiconductor integrated circuit and the controller may reside on a camera lens focusing module.

Particular implementations of the invention may provide one or more of the following advantages. The motion control device can achieve accurate linear motion control over the position of any motor (e.g., VCM) that it controls, despite significant variations in the start-of-travel and end-of-travel positions that may be observed between individual motors. Besides enhanced accuracy, other benefits to the user or application include repeatability as well as improved speed, for example, reduced focusing time in camera lens focusing modules. In addition, external microcontroller-executed calibration routines are no longer necessary.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
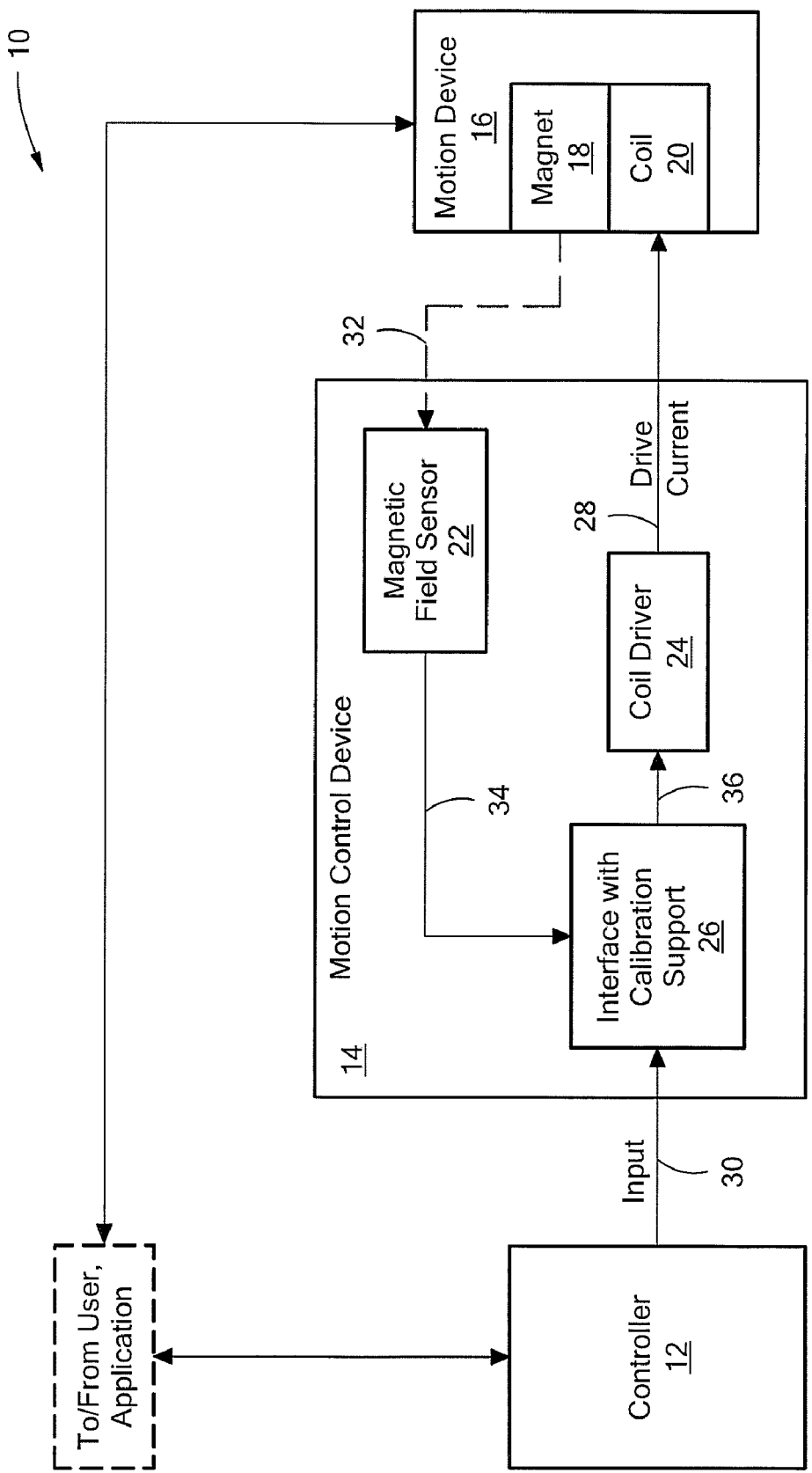
FIG. 1 is a block diagram of an exemplary control system employing a motion control device that includes a magnetic field sensor, a coil driver and an interface with self-calibration support.

FIG. 1 shows an exemplary control system 10 that provides closed-loop motion control to a positioning application. The control system 10 includes a controller 12 connected to a motion control device (or "device") 14. The control system 10 also includes a motion device 16, which includes an assembly having a magnet 18 and a coil 20. The magnet/coil assembly connects to a device or structure to be moved for a given application. In one embodiment, described herein, the magnet 18 is movable relative to the coil 20 and the control system 10 controls the movement of the magnet 18 with the coil 20. The motion device 16 may be any type of linear motion device, for example, a linear motor such as a voice coil motor (VCM). The positioning application may be any application that utilizes a displacement produced by the motion device.

The motion control device 14 includes a position sensor shown as a magnetic field sensor 22, a coil driver 24 and an interface with calibration support 26. The magnetic field sensor 22 may be any magnetic field sensing device, for example, a Hall-effect sensor (Hall sensor) or some kind of magneto-resistive (MR) sensor. The MR sensor may be made with any type of MR element, including, but not limited to: GMR, including unpinned sandwich, antiferromagnetic multilayer and spin valve structures; anisotropic magnetoresistance (AMR); magnetic tunnel junction (MTJ, also known as spin-dependent tunneling or "SDT"); and tunneling magnetoresistance (TMR). The device 14 provides to the coil 20 a current signal 28 that is related to an electrical input 30 received from the controller 12. The device 14 uses the magnetic field sensor 22 to detect magnetic field strength 32. Based on that detection, the magnetic field sensor provides a sensor output signal 34 to the interface 26.

Still referring to FIG. 1, the interface 26 serves to interface the coil driver 24 to the controller 12 as well as to couple the coil driver 24 to the magnetic field sensor 22. It receives the output of the magnetic field sensor 22, sensor output 34, as an input voltage signal and provides an output voltage signal 36 to the coil driver 24, which the coil driver 24 converts to a drive current (or drive signal) 28 to be applied to the coil 20. The sensor-to-driver connection allows the device 14 to correct position based on sensor feedback internally, that is, without intervention by the controller 12 (and/or user), or the need for other components, to provide positional feedback information. In addition, and as will be described in further detail below, the interface 26 includes calibration support to enable the motion control device 14 to calibrate itself. This "self-calibration" allows the control system user or application to obtain linear positioning from a non-linear control loop.

In one exemplary embodiment, the linear motion control device 14 is implemented as a semiconductor integrated circuit (IC). That is, the magnetic field sensor is integrated with the circuitry of the coil driver 24 and interface 26 on a single semiconductor substrate. Therefore, the device 14 may be manufactured and sold as an IC for use in a module design.

It will be appreciated that FIG. 1 is intended to depict only a functional partitioning of the control system 10. If constructed as an IC, the motion control device 14 may be mounted or embedded in the magnet/coil assembly of the motion device itself. An example of such a magnet/coil assembly, in which the magnet moves relative to a stationary coil, is described in co-pending U.S. patent application Ser. No. 11/865,118, entitled "Hall-Effect Based Linear Motor Controller," filed on Oct. 1, 2007 in the name of David et al. and assigned to Allegro Microsystems, Inc., the assignee of the subject application. In that example, the IC is connected to the drive coil 20, the drive coil 20 is mounted (or coupled) to a biasing mechanism and the movable magnet is suspended above the device/coil structure by a mechanical suspension system that allows movement along a desired path of motion. The magnet/coil assembly could instead employ a stationary magnet and movable coil, or be replaced with some other mechanism capable of producing a change in magnetic field strength with change in position.

Figure 2:
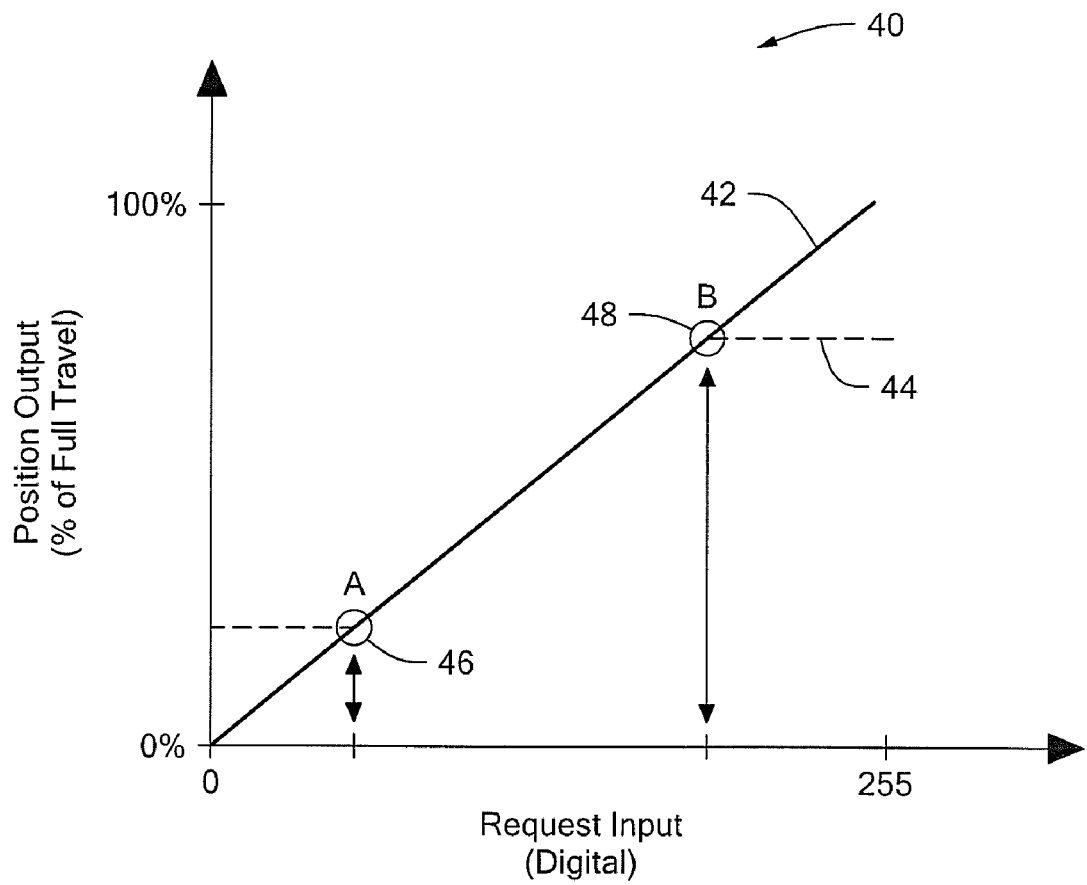
FIG. 2 is a graph depicting ideal and measured transfer functions for input request versus output response (position).

FIG. 2 shows a graph 40 depicting a relationship between a control signal or request input, and a position output. A first plot 42 (indicated by a solid line) shows an ideal transfer function curve for a relationship that is linear (that is, the position output is directly proportional to the input so that the plot of output versus input describes a straight line) over the full dynamic input range, such as 0V to VDD. In the example shown, the request input is depicted as an 8-bit digital input, with a 0 value corresponding to a home (or start-of-travel) position and a value of 255 corresponding to a full travel (or end-of-travel) position, so the full dynamic input range would be 0 to 255. A second plot 44 (indicated by dashed lines) shows a real transfer function for a motion device in which the position output is measured for a request input. There is an offset associated with the start-of-travel position and a reduced range of travel associated with the end-of-travel position. An input value corresponding to the offset is indicated by reference numeral 46 (and labeled "A") and an input value corresponding to the end-of-travel position is indicated by reference numeral 48 (and labeled "B"). Consequently, the relationship of output to input for the real curve is not linear over the full dynamic range of 0 to 255 but instead between (and including) input values at A and B. Because different motion devices can have different amounts of offset and ranges of travel, the input range endpoints at A and B have some variability associated with them.

For an understanding of the practical implications of offset and range of travel limitations, consider as an example the case of a camera focus system. A common focus algorithm moves the camera lens through a series of discrete positions in an effort to determine the optimum focus position. An "ideal" VCM, one that supports a full dynamic range of the request signal, will move the camera lens reliably through all of the desired number of focus steps to achieve a fine focus capability. A typical VCM with some offset and limited range of travel, however, will move the camera lens through a smaller number of focus steps and therefore achieve only a coarse focus capability.

The motion control device 14 therefore compensates for differences between the ideal and real (measured) output responses. It performs a self-calibration that measures the end points of travel of the motion device 16 ("calibration values") and changes the input range, more specifically, the input range's endpoints corresponding to home and full travel positions, from those of a full dynamic input range specified by the requesting user or application (via the controller) to endpoints measured during calibration. Since the device 14 contains a position sensor, a driver and calibration support, it can effect movement of a motion device through its full range of travel, capture the start-of-travel and end-of-travel positions of the motion device, and use that information to compensate for the offset and range of travel variation unique to that particular motion device. Having been self-calibrated, the motion control device subsequently operates to "scale" or adjust the input (and therefore, the response of the control system) relative to the input range. This scaling or adjustment results in improved response (as well as speed) of the control loop, since the motion device is used over only the part of its range where it provides predictable performance and linearity.

The request input is the input entered by the user (through the controller) to select a position of the motion device. The request input could be an analog signal, a pulse width modulated (PWM) signal or a digital value provided via an interface protocol, for example, a serial interface protocol such as I²C.

The self-calibration may be initiated in a number of different ways. For example, it may occur automatically for every power on cycle. Alternatively, or in addition, a calibration request may be generated as a calibration command submitted to the motion control device 14 by the controller 12 through the request input 30 itself or some other control line(s) (for example, a dedicated calibration control input). The timing may be event-driven, user-defined or both.

Figure 3:
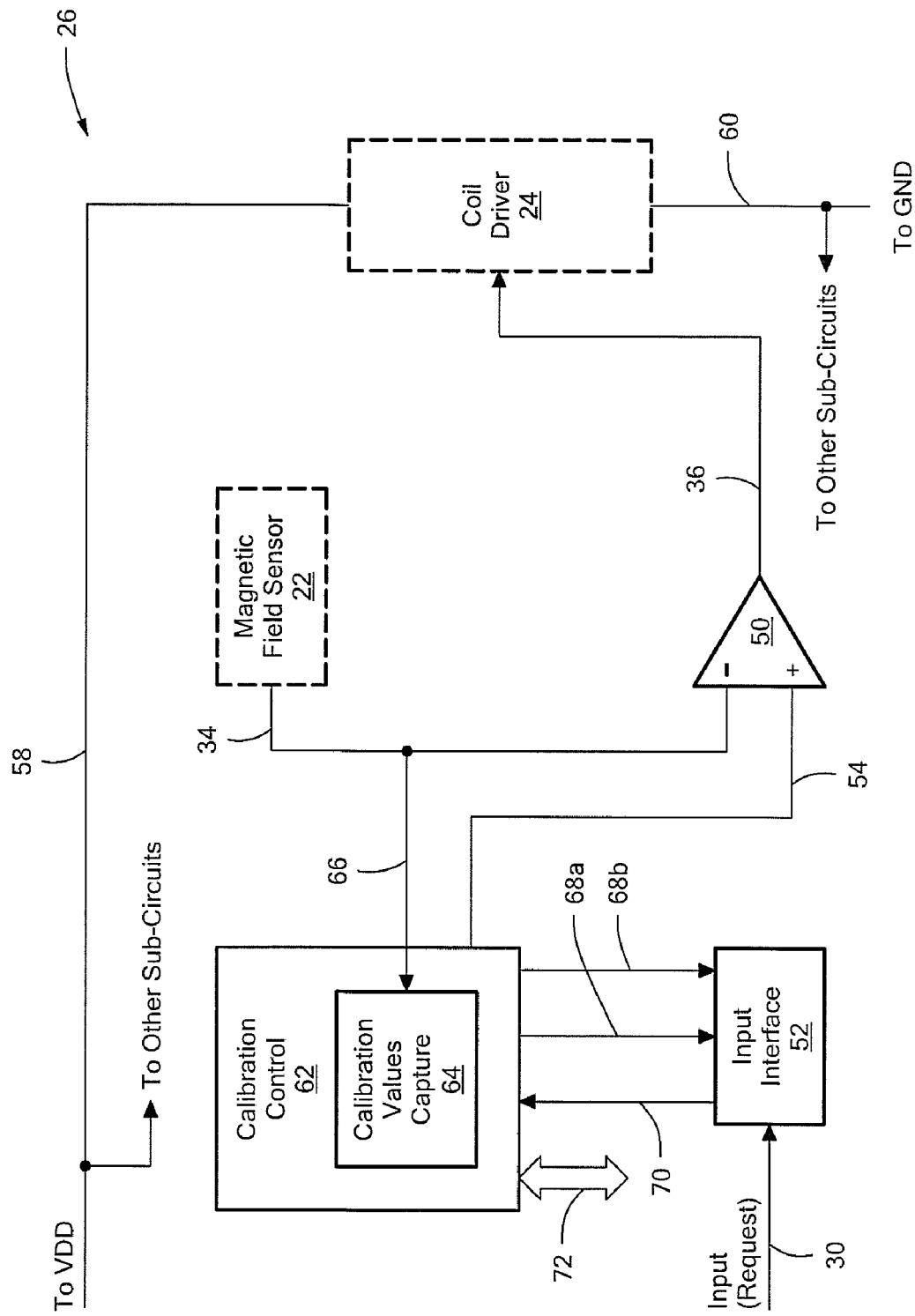
FIG. 3 is a partial block, partial schematic diagram of the interface (from FIG. 1), which includes an input interface and a calibration control block.

Referring to FIG. 3, the interface 26 includes an amplifier 50, a high-gain difference amplifier that operates as a comparator, and an input interface 52. The input interface 52 receives the input 30 from the controller 12 (shown in FIG. 1). The amplifier 50 receives as inputs an input signal 54 and the magnetic field sensor output signal 34. It generates the output signal 36 based on the signals 34 and 54, and that output signal 36 is provided to the coil driver 24. Also shown in FIG. 3 is a supply voltage line 58 that is used to connect the coil driver 24 to an external supply voltage ("VDD") and a ground line 60 to connect the coil driver 24 to ground ("GND"). Other sub-circuits connect to supply and ground as well, as indicated.

Referring to FIGS. 1 and 3, the interface 26 drives current through the coil 20. The current in the coil 20 changes until the position of the motion device 16 results in a magnetic field sensor output voltage (output 34) that has a predetermined relationship with respect to the input 54, such as matching the input 54. Assuming that the device 14 has already calibrated itself, the input 54 would be an adjusted version of input 30 and may be referred to herein as the adjusted input.

As mentioned earlier, the interface 26 includes support for the self-calibration. Calibration control is provided in a calibration control block 62. The calibration control block 62 includes a calibration values capture block 64, which receives calibration values (that is, sensor output 34 measured for home and full travel positions) at calibration control block input 66. Those calibration values, or values derived or computed from the calibration values, are provided to the input interface 52 via lines 68a and 68b. In one embodiment, the calibration values capture block 64 may be implemented with two separate sample and hold (S/H) circuits—one for capturing the full travel position value and the other for capturing the home position value.

The calibration control block 62 receives an output signal from the input interface 52, shown as output 70, and provides that signal as the input 54 to the amplifier 50 when the device 14 is operating in a normal (non-calibration) mode of operation. When a calibration is requested, the calibration control block 62 internally generates the signal provided as amplifier input 54. Thus, during self-calibration, it is the calibration control block 62 that causes generation of the drive signal so that home and full travel calibration values can be acquired. Otherwise, during normal operation, the drive signal is based on the user-provided input 30.

Interconnections for other calibration and output control related purposes are represented generally by line(s) 72. These would include, for example, communications (from input interface 52) regarding received calibration requests, if the input 30 is being used to transfer a calibration request command to the input interface 52.

Figure 4:
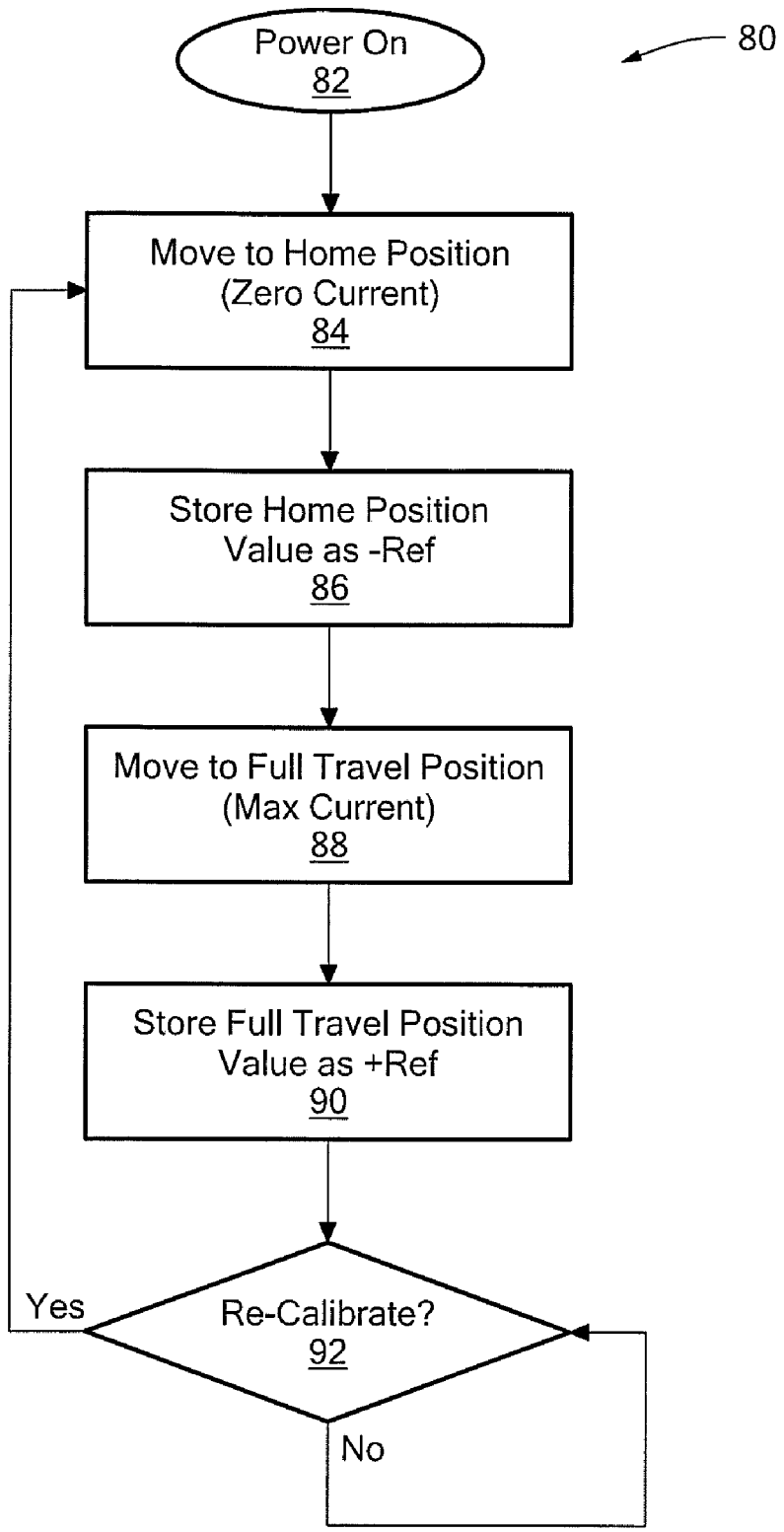
FIG. 4 is a flow diagram illustrating an exemplary self-calibration as performed by the motion control device from FIG. 1.

Referring to FIG. 4, in one exemplary embodiment, the self-calibration 80 operates as follows. Once the self-calibration is initiated (block 82), for example, at power on as shown, the calibration control block 62 causes an output value to be generated by the sensor when a 0 mA current is applied to the coil (block 84) and that output value to be stored as a home position value or first calibration value, "−Ref" (block 86). That is, a 0 mA coil current is provided to the coil driver 24 to effect movement of the motion device to home position and the sensor output voltage is captured when the motion device is in the home position. The calibration control block then causes a current to be provided to the coil to effect a maximum displacement (i.e., full travel) of the motion device and a sensor output to be generated for the full travel position (block 88). The sensor output value is then stored as a full travel position value or second calibration value, "+Ref" (block 90). In other words, the calibration control block 62 maximizes the coil current provided to the coil driver 24 to move the motion device to its maximum (or full travel) position and captures the sensor output voltage at that position. The calibration control block 62 determines (at block 92) if it is time to perform another calibration—if so, the self-calibration will begin again at block 84. In the illustrated example, self-calibration occurs at power on and at other times specified by a calibration command (via the input request) or other control signal.

By "storing" it is meant that the calibration values are captured and provided to circuitry in the input path or, alternatively, the sensor output path, for compensation purposes, as will be described with reference to FIGS. 5A-5C (showing input path circuitry) and FIGS. 6A-6B (showing sensor output path circuitry). In one embodiment, and referring back to FIG. 3, when the calibration values are "stored", they are captured by the circuitry of the calibration values capture block 64 and subsequently provided to the input interface 52 on lines 68a and 68b.

Figure 5A:
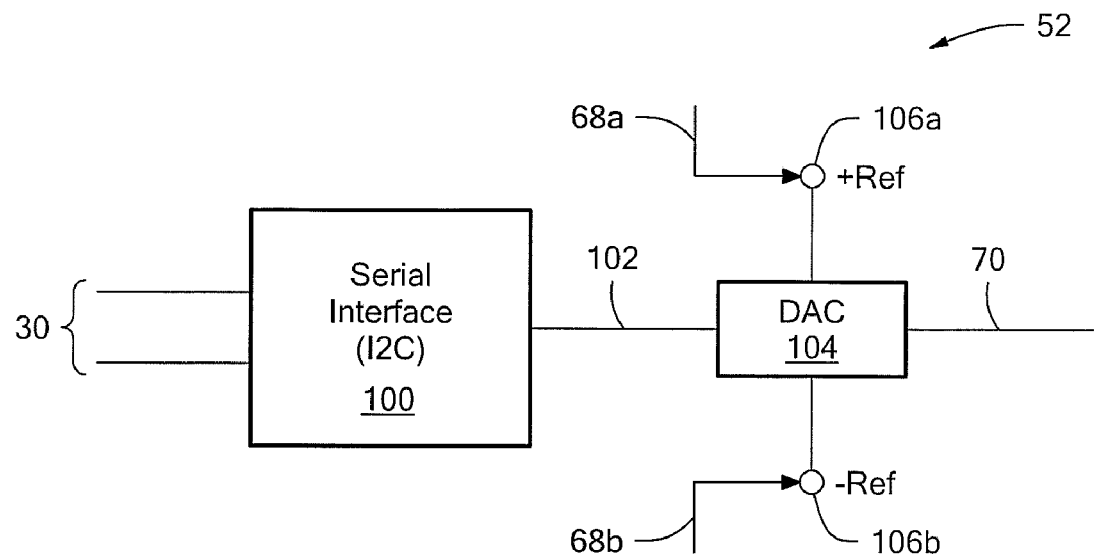
FIGS. 5A-5C are partial block, partial schematic diagrams of the input interface from FIG. 3 for a digital input request (FIG. 5A) and for an analog input request (FIGS. 5B-5C)
Figure 5B:
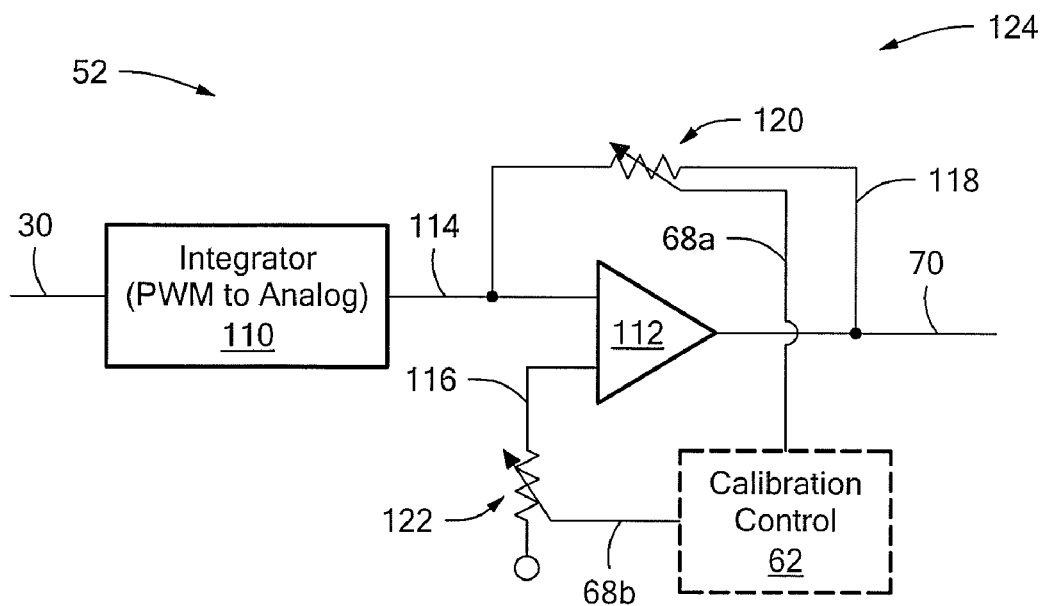
Figure 5C:
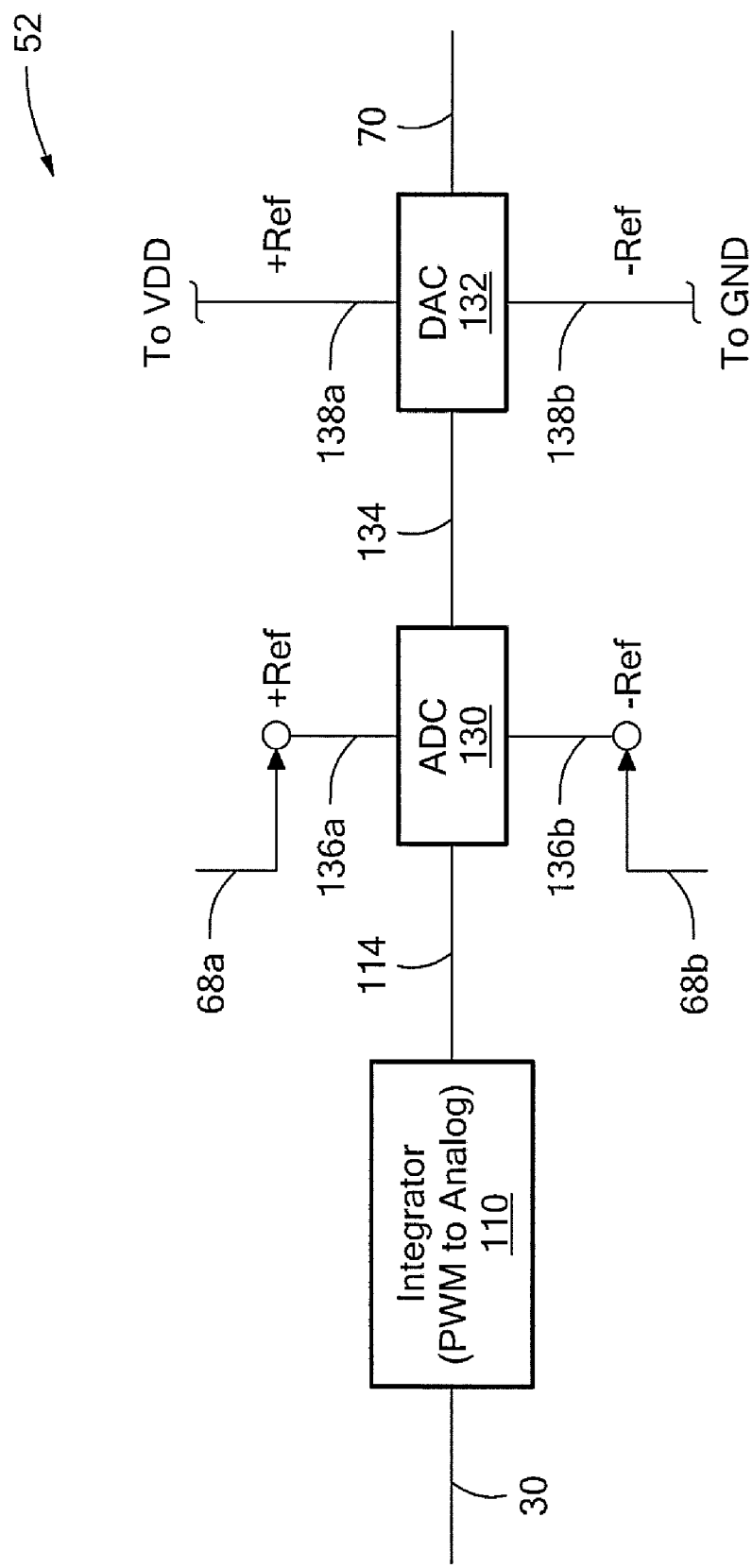

FIGS. 5A, 5B and 5C show alternative embodiments of the input interface 52. Referring first to FIG. 5A, the input interface 52 is implemented to receive a digital input as input 30. In the example shown, the input 30 is received by a serial interface 100 (for example, an I²C interface), which provides a digital code over line 102. The line 102 couples the serial interface 100 to a digital-to-analog converter ("DAC") 104. The DAC 104 generates a representative analog output for the digital input. The DAC 104 has terminals 106a and 106b, which correspond to the DAC's high reference input +Ref and low reference input −Ref, respectively. The high reference input at terminal 106a defines the maximum output when input bits are all 1's and the low reference input at terminal 106b defines the minimum output when the input bits are all 0's. These DAC terminals are coupled to the calibration values lines 68a and 68b and receive on those lines the captured calibration values. When the sensor output 34 is a measure of home position (during self-calibration), it is provided to terminal 106b. When the sensor output 34 is a measure of full travel position (during self-calibration), it is provided to terminal 106a. Thus, the DAC terminal 106a, for +Ref, is set with the calibration value for the full travel (end-of-travel) position, and the DAC terminal 106b, for −Ref, is set with the calibration value for the home (start-of-travel) position.

After calibration, when a non-calibration input request is received at input 30, the DAC 104 produces an output, input interface output 70, that is "scaled" according to the DAC input range defined by the calibration-based references. The analog output of an n-bit DAC is: $\{(\text{digital input})(+\text{Ref}-{-\text{Ref}})\}/(2^n-1)$. For example, for +Ref=5.0V and −Ref=0V and an input value of 10000000 ($128_{10}$), the output will be 2.5V. When updated for calibration values to be +Ref=3.0V and −Ref=1V (for the same input value), the output will be 1.0V. Thus, the input is appropriately scaled by the input range voltage (i.e., +Ref−−Ref), which serves to linearize the output response. That is, it produces a change in the drive signal 28

(from FIG. 1) that corresponds linearly to a different motor position. Any DAC architecture, such binary-weighted or R-2R ladder network, may be used.

The resulting linearization of the output response is transparent to the user/controller. For example, suppose that the request input 30 accepts an analog signal with an input range of 0V to VDD. The difference amplifier 50 determines the difference between the input 54 (that is, the adjusted input) and the sensor output 34, and sends coil driver signal 36 to the coil driver 24. The coil driver drives the motion device to the requested position. The displacement of the motion device is measured by the sensor 22, which provides the measured output 34 to the difference amplifier 50 such that the current through the coil is adjusted until the input values to the difference amplifier 50 match.

Now turning to an exemplary analog implementation of the input interface 52 as illustrated in FIG. 5B, the input interface 52 receives as input 30 an analog input or a PWM input which is translated from PWM to analog by an integrator 110. The analog input is referenced from GND to VDD. The input interface 52 includes a difference amplifier 112 having a first input 114 coupled to the output of the integrator 110, a second input 116 and output 70. The difference amplifier 112 has a feedback loop 118 between the output 70 and input 114 that contains a variable resistance element (or potentiometer or R-2R ladder DAC) 120 for adjusting gain. A value of gain is set by adjusting the value of the element 120. The gain value is determined to be the difference between the calibration values. The input 116 contains a variable resistance element (or potentiometer or R-2R ladder DAC) 122 for adjusting reference voltage to equal the offset. The offset can be increased or decreased by changing the value of the element 122. The amplifier 112 with gain and offset adjustment circuitry is indicated by reference numeral 124. In this implementation, the calibration values lines 68a, 68b, which are coupled to the elements 120, 122, are used to scale the input voltages from referencing GND to VDD to referencing the output 34 of the magnetic sensor 22 at home and full travel positions. That is, the gain and offset are adjusted so that the control signal matches the calibration values.

It may be desirable to adjust the gain first at full travel and then the offset at home position, as the offset may be affected slightly by the gain adjustment. For example, if the home position offset is non-zero, then changing the gain will also change the value of the home position offset and result in some amount of error.

Other input interface implementations are possible as well. As shown in FIG. 5C, for an analog input or a PWM-to-analog translated analog input, the input interface 52 may include an analog-to-digital converter (ADC) 130 followed by a DAC 132. The ADC 130 is used to scale the input in an ADC input range defined by the calibration values and the DAC 132 converts a digital output 134 of the ADC 130 back to the analog domain. The calibration values 68a, 68b are provided to the ADC 130 for use as ADC references 136a (+Ref) and 136b (−Ref), respectively. The references 136a, 136b define the maximum input range of values (in Volts) that the ADC 130 can convert. The reference input 136a defines the maximum input when all the ADC output bits are 1 and reference input 136b the minimum input when all the ADC output bits are 0. For an n-bit ADC, the input range is divided into $2^n$ values (for example, 256 values for an 8-bit ADC) or voltage steps. The size of the voltage step is given by the input range divided by the number of voltage steps. Thus, if the 8-bit device has an input range defined by a +Ref of 5V and a −Ref of 0V, the voltage step size is 5V/256, or 19.5 mV. Changing the references to a +Ref of 2V and a −Ref of 1V gives a step size of 1V/256, or 3.9 mV. The value read from the ADC after conversion is: $(Vin/Vref) \times (2^n-1)$, where Vin is the input voltage and Vref is equal to (+Ref−−Ref). Thus, Vin can be said to be scaled by 1/Vref. Any type of ADC architecture, for example, flash, successive approximation, sigma-delta, may be used.

During calibration, the output of the ADC 130, shown as output 134, sweeps from a first count corresponding to the motion device's home position (−Ref value 136b) to a last count corresponding to the motion device's full travel position (+Ref value 136a). Assuming, for example, an 8-bit system, the first count would be '00000000' and the last count would be '11111111'. Therefore, the ADC 130 has digitally compensated for the unique range of travel for a single motion device. The DAC 132 is then used to change the digital ADC output 134 back into an analog signal, output 70, with a full dynamic range from ground to VDD. The DAC references, shown as +Ref 138a and −Ref 138b, are therefore connected to VDD and ground, respectively.

Figure 6A:
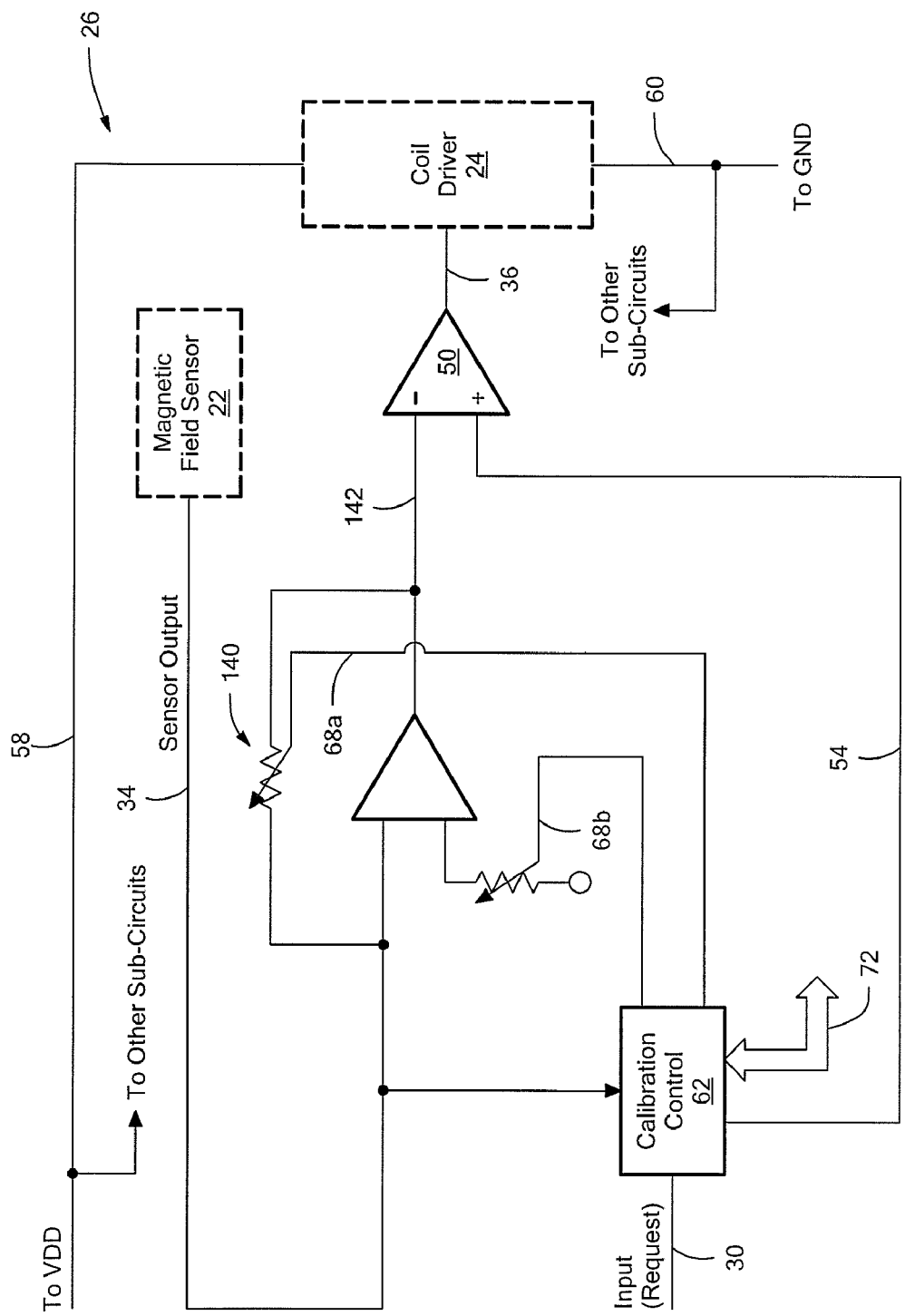
FIGS. 6A-6B are partial block, partial schematic diagrams of alternative embodiments of the interface (from FIG. 1)
Figure 6B:
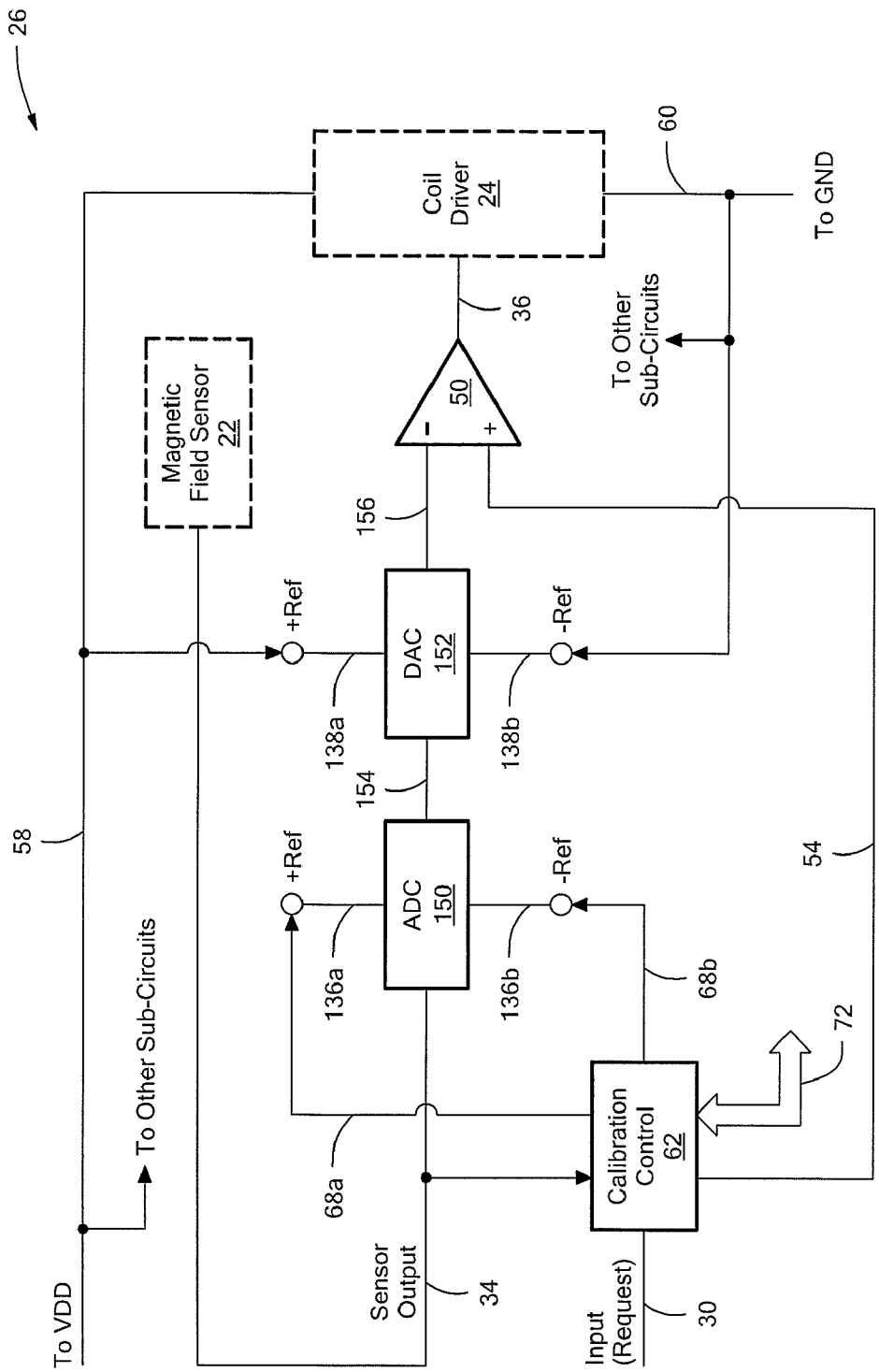

FIGS. 6A-6B show alternative embodiments of interface 26. In these alternative embodiments, the calibration adjustment occurs in the sensor output path (and not the input path as was shown in FIGS. 3, 5A, 5B and 5C) between the output 34 of sensor 22 and the difference amplifier 50. In these embodiments, input 30 is provided to the calibration control block 62, which provides input 30 to the difference amplifier 50 as input 54 during normal operation and provides an internally generated signal as input 54 during self-calibration.

Referring to FIG. 6A, coupled between the sensor 22 and the difference amplifier 50 is sensor output path (or sensor output interface) circuitry 140 shown as an amplifier with gain and offset adjustment circuitry 140. The amplifier with gain and offset adjustment circuitry 140 is like the amplifier with gain and offset adjustment circuitry 124 shown in FIG. 5B. It differs from circuit 124 in that it receives the sensor output 34 as its input and provides a scaled sensor output value 142 (as its output) to the amplifier 50. Internal components and configuration are the same as shown in FIG. 5B.

Referring to FIG. 6B, the interface 26 includes sensor output path (or sensor output interface) circuitry shown as a back-to-back ADC 150 and DAC 152. The ADC 150 receives the analog sensor output 34 as its input. During a calibration, that output 34 is provided to the calibration control block 62. When the output 34 is a measure of home position, it is captured and provided to the ADC 150 for use as ADC reference 136b (−Ref) via the calibration values line 68b. When the output 34 is a measure of full travel position, it is captured and provided to the ADC 150 for use as ADC reference 136a (+Ref) via calibration values line 68a. Once calibrated, when the ADC 150 accepts the sensor output 34 as an analog input value (e.g., an analog voltage), it converts it to a scaled digital value 154. The references 136a, 136b define the maximum input range of values (in Volts) that the ADC can convert. The references for the ADC 150 are therefore adjusted to match the range of travel as defined by the sensor output 34. The DAC 152 is used to change the digital ADC output 154 back into an analog signal, DAC output 156, with a full dynamic range from ground to VDD.

In the embodiments shown in FIGS. 6A-6B, the input 30 is assumed to be an analog signal referenced from GND to VDD. The input 30 could instead be provided as a PWM signal (with an integrator to translate the PWM signal into an analog signal, as shown in FIGS. 5B-5C) or as a digital input (like that shown in FIG. 5A). If a digital input is used, the digital input would need to be converted to an analog input by a DAC. Alternatively, and referring to FIG. 6B, the DAC 152 in the sensor output path could be eliminated and the difference amplifier 50 replaced with a digital comparator.

The settings of +Ref and −Ref in FIG. 5A, 5C or 6A, or alternatively, the settings of gain and offset in FIGS. 5B and 6B, are maintained until the next calibration (re-calibration) is performed and new calibration values are acquired under the control of the calibration control block 62.

What the foregoing features achieve is a closed loop system that compensates for the unique start and stop positions of a particular motion device. It need not concern itself with the unique travel range of that motion device. Another user/application and controller can use the same motion control device to control another motion device having a different range of travel. Thus, the motion control device 14 eliminates any guesswork from a control perspective and allows users to design with very small and unpredictable actuator motors. With the self-calibration feature, therefore, a user of the motion control device 14 can derive improved accuracy from a system having a less than ideal output response.

It should be noted that the magnetic circuitry of the magnet and magnetic field sensor may result in a condition where the sensor output 34 is saturated either in the home position or at the full travel position of the motion device. To calibrate, the motion control device 14 must be in the magnetic linear operating zone of the sensor circuitry. This can be achieved by changing the magnetic signal or adjusting the gain and offset of the magnetic field sensor circuitry. Gain and offset adjustment circuitry like that shown in FIGS. 5B and 6A may be used in the sensor amplifier to adjust gain and offset and therefore allow linear operation. Before actuating the motion device out of the home position, an offset adjustment may be used to force the sensor output 34 to exceed a known voltage that is not in the saturation region of the sensor's internal amplifier. After the offset has been adjusted, the capture of the start-of-travel position value can occur. When actuating the coil current to full value and driving the motor to the end-of-travel position, a gain adjustment may be used to adjust the gain so that the sensor output 34 falls below a certain voltage that is not in the saturation region of the sensor's internal amplifier. The end-of-travel position value can be acquired after the gain adjustment occurs. Other techniques, in particular, magnetic circuit design techniques, may be used as well.

As discussed above, a re-calibration may be initiated after some elapsed time or in response to a trigger (such as power on, calibration command or signal, and so forth). Re-calibration may be necessary, as calibration error as well as variations, e.g., changes over time due to temperature and/or mechanical movement, that may influence the magnetic signal at home position and put the device out of calibration may occur. Other techniques may be helpful as well. For example, it may be desirable to "buffer" the start-of-travel by targeting travel for x % (where x is a value greater than zero) to 100% of the input request range. Consider again the case of an 8-bit digital input. For an 8-bit digital input, travel targeted for, say, 10% to 100% of the 8-bit command would result in travel for codes 25 to 255. The 0-10% of the input codes would serve as buffer for both calibration error and variations in the home position that are encountered after calibration but before a re-calibration can occur. If large changes occur over time, or if full travel cannot be reached because the highest input code or value falls short of full travel (as would be the case if buffering were used), then a re-calibration may be required to optimize travel for the application.

Figures 7A, 7B:
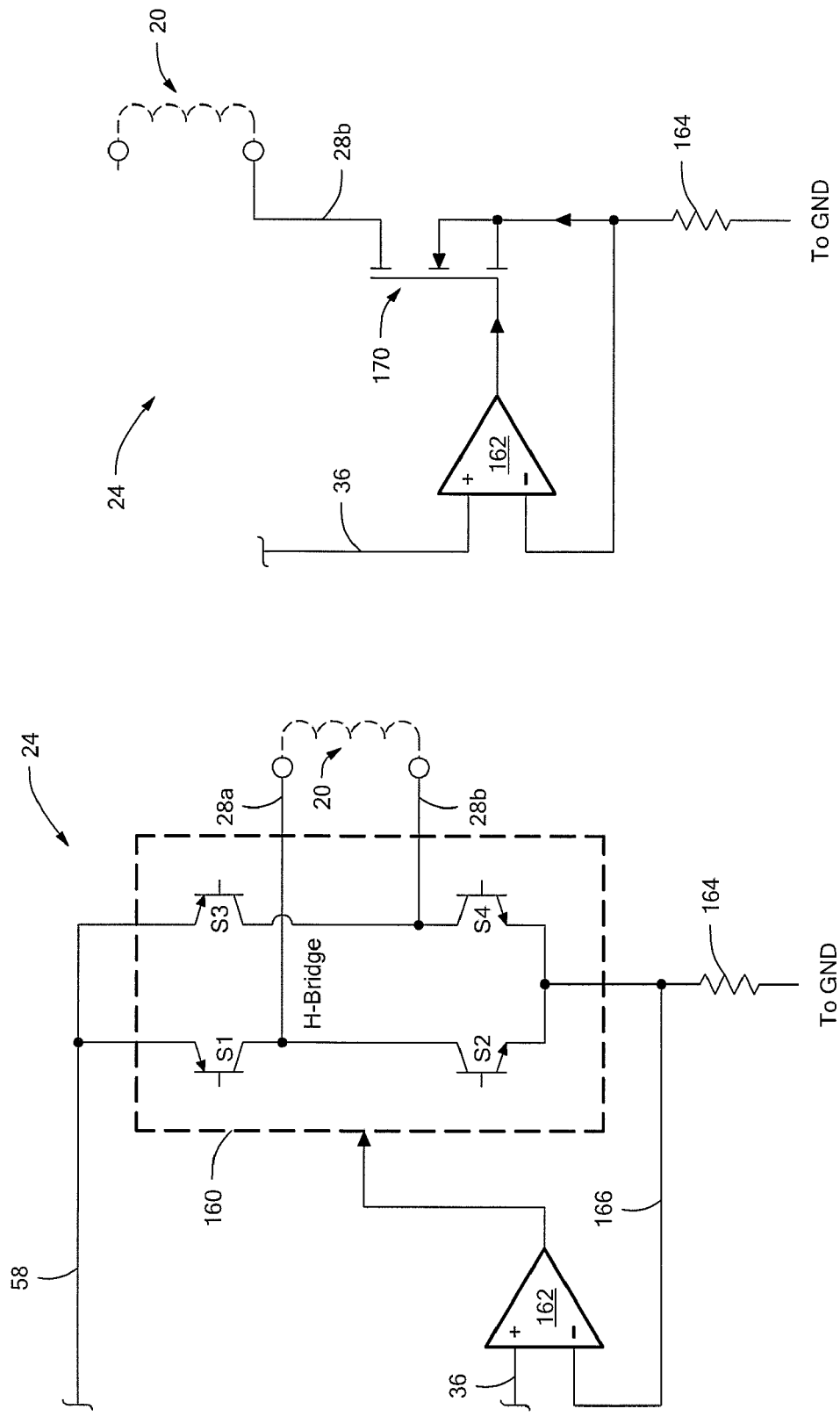
FIGS. 7A and 7B are partial block, partial schematic diagrams of the coil driver from FIG. 1 implemented as a full or "H-bridge" coil driver (FIG. 7A) and a low-side coil driver (FIG. 7B)

FIG. 7A shows an exemplary embodiment of the coil driver 24 that is particularly well-suited to linear motor drive and control of small linear motors such as vibration motors, shutter triggers, polarization filters, speaker control, to give but a few examples. In this embodiment, the coil driver 24 is implemented to include an H-bridge circuit 160. Also included is an amplifier 162 and a sense resistor 164. The amplifier 162 receives its non-inverting input the output signal 36 produced by the difference amplifier 50 (from FIG. 3). The inverting input, shown as input signal 166, is coupled to the H-bridge 160 and connects to ground through the sense resistor 164. This type of coil drive, referred to as an H-bridge or full bridge driver, provides for bidirectional current flow, thus enabling a linear motor to run in a forward and reverse direction. Drive current output 28 (from FIG. 1) is shown here to include a first output 28a which connects to one end of an external coil (coil 20 from FIG. 1) and a second output 128b which connects to the other end of the external coil. In the illustrated embodiment, the H-bridge circuit 160 is constructed with four solid-state switches (labeled S1, S2, S3, S4, in the figure). When S1 and S4 are closed (and S2 and S3 are open) current flows through the coil 20 in one direction. Opening S1 and S4 and closing S2 and S3 causes current to flow through the coil 20 in the reverse direction.

FIG. 7B shows an exemplary embodiment of the coil driver 24 that can be used to drive a motor such as a VCM. In this embodiment, the coil driver 24 is implemented as a low-side, voice coil driver. The coil driver 24 includes a MOSFET 170 (in addition to components 162 and 164) as the output driver. This type of coil driver provides for unidirectional current flow only. The coil driver current output, shown as output 28b, connects to the low side of an external coil (coil 20 from FIG. 1). The high side of the external coil would be connected to an external power supply such as a battery.

Figure 8:
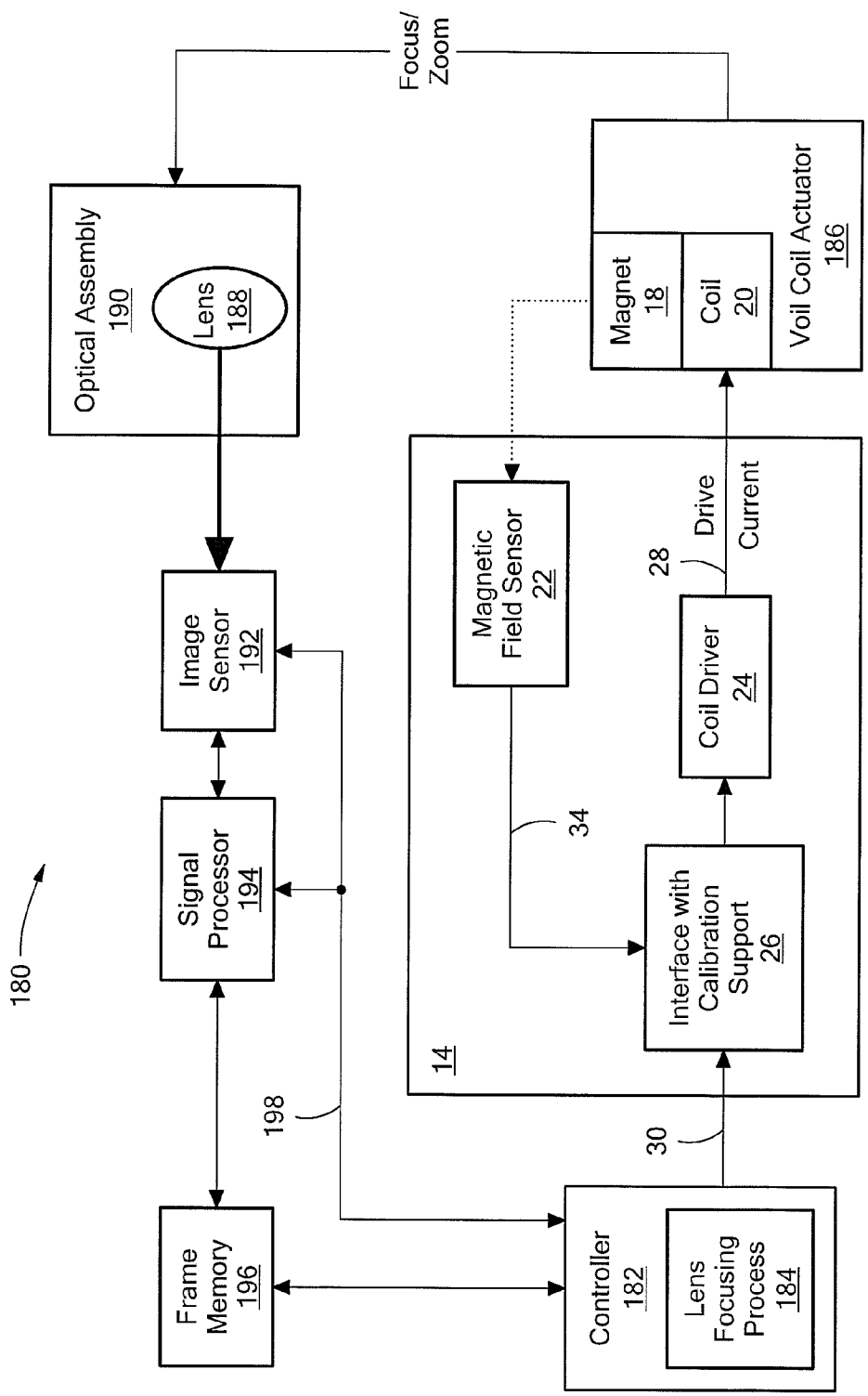
FIG. 8 is a block diagram of an exemplary camera lens focusing system in which a motion control device such as that shown in FIG. 1 may be utilized.

The device 14 (FIG. 1), with the calibration support and other features of interface 26, as described above, may be used in a variety of other applications, such as applications that use voice coil motors. One example, as shown in FIG. 8, is a camera lens focusing module (or "module") 180 as may be used in a mobile phone with camera, also known as a camera phone. Voice coil motors are useful as actuators in limited motion, high frequency activation applications, such as that of the lens driving device of module 180, as well as other precision instrument applications.

The module 180 includes a controller 182 that executes a lens focusing process 184 and provides control signals to other blocks of the module. The controller 182 may control overall operation of the camera phone and thus switch between telephone and camera functions, or the controller 182 may be dedicated to a camera mode of operation (with a separate controller for handling the telephone mode). The controller 182 is connected to the device 14, which drives a VCM 186. As indicated earlier with reference to FIG. 1, the device 14 may be constructed as a semiconductor integrated circuit with coil driver and magnetic field sensor integrated on a single substrate. The coil driver may be implemented like coil driver 24 shown in FIG. 7B for unidirectional drive.

The VCM 186 controls the linear movement of a lens 188 of an optical assembly 190 to adjust the lens focus. The coil driver 24 of the device 14 controls the VCM 186. The module 180 also includes an image sensor 192, a signal processor (SP) 194 and a frame memory 196. The operation of this module will now be described.

Assuming that the controller 182 has switched to a camera function or is in a camera mode, the image sensor 192 is activated, and the controller 182 sends a control signal (timing signal) via control lines 198 to the image sensor 192 to start an image capturing process. An image projected by the lens 188 onto the image sensor 192 is scanned and applied to the SP 194. The controller 182 activates the signal processor 194 to begin auto focus processing. The SP 194 performs sampling, amplification and A/D conversion to an image signal output from the image sensor 192 and outputs the digital image data. The frame memory 196 temporarily stores the digital image data sequentially output from the SP 194. The SP 194 determines a contrast value of the image according to the image data stored in the frame memory 196. Every time the image is captured by the image sensor 192 and that image is stored in the frame memory 196, the SP 194 reads the image data and calculates the contrast value.

The controller 182 outputs a control signal 30 to the linear motion control device 14 to begin focus adjustment. The driver portion of the device 14 generates the drive signal 28 according to the input signal 30 from the controller and the feedback signal 34 from the magnetic field sensor 22. The lens position adjustment by the VCM 186 results in change in image sharpness. The SP 194 determines contrast value of the image data sequentially captured by the image sensor 192 and compares values between images captured before and after lens movement. The SP 194 detects that the image with best sharpness is obtained when the contrast value that is a peak value is detected and sends a detection signal to the controller 182. The controller 182 sends the appropriate control signal (to the device 14) to move the lens 188 back to the position where the peak contrast value was obtained, that is, the precise position to achieve best sharpness to complete the focus adjustment. Although the SP 194 is described as determining a contrast value, other parameters indicative of optimum focal position may be computed by the SP 194.

Manufacturing tolerances, as well as lens orientation (relative to the direction of gravitational pull and applied loads like acceleration, etc.), do not allow for consistent lens movement in response to current applied to the coil. The self-calibration employed by the device 14 allows the control system to be precisely calibrated to a specific lens focus module. The self-calibration calibrates the linear motion control to the individual lens focus module for precision focusing independent of manufacturing variations of the assembly, and linearizes actuator transfer function non-linearities in the camera focus module.

The self-calibration also minimizes focus time and enhances focus accuracy, which ultimately speeds up the control of the motor in the application. For instance, in the case of the AF module, since the sensor has compensated for the variations in positions and range of travel of the motors, the microcontroller does not have to waste time trying to step the motors in the ranges over which they do not move. The microcontroller will know that as soon as the command to move is given the motor will move. This time saving reduces the overall time to take a picture, a clear advantage.

All references cited herein are hereby incorporated herein by reference in their entirety.

Having described preferred embodiments of the invention, it will now become apparent to one of ordinary skill in the art that other embodiments incorporating their concepts may be used. For example, the motion control device 14 and motion device 16 could be implemented to use other types of sensors, such as optical or capacitive sensors, for sensor 22. It is felt therefore that these embodiments should not be limited to disclosed embodiments, but rather should be limited only by the spirit and scope of the appended claims.

What is claimed is:

1. A device for controlling a motor, comprising:
 a driver and a sensor;
 first circuitry, coupled to the driver and sensor, to control the driver and sensor to produce calibration information for the motor;
 second circuitry, coupled to the first circuitry, to adjust an input of the second circuitry relative to an input range that is based on the calibration information; and
 wherein the adjusted input is usable to produce a drive signal to drive the motor.

2. The device of claim 1 wherein the calibration information comprises a first calibration value corresponding to a start-of-travel position value output by the sensor when the driver provides no current to the motor and a second calibration value corresponding to an end-of-travel position value output by the sensor when the driver provides to the motor a current capable of producing a maximum position change.

3. The device of claim 2 wherein the second circuitry comprises an input interface to receive an input request as the input and the first circuitry comprises a calibration control block that provides the first and second calibration values to the input interface.

4. The device of claim 3 wherein the input request comprises a digital value, and wherein the input interface comprises a digital-to-analog converter (DAC) having a first reference terminal to receive the first calibration value as a first reference and a second reference terminal to receive the second calibration value as a second reference, the first and second references defining the input range.

5. The device of claim 3 wherein the input request comprises an analog signal, and wherein the input interface comprises an operational amplifier having gain circuitry adjustable to set a gain value based on the first and second calibration values, and offset circuitry adjustable to set an offset value equal to the first calibration value, wherein the gain and offset values define the input range.

6. The device of claim 3 wherein the input request comprises a pulse width modulated signal and wherein the input interface further comprises an integrator to translate the pulse width modulated signal to an analog signal.

7. The device of claim 2 wherein the second circuitry comprises circuitry to receive an output from the sensor as the input, and the first circuitry comprises a calibration control block that provides the first and second calibration values to the circuitry.

8. The device of claim 7 wherein the circuitry comprises an operational amplifier having gain circuitry adjustable to set a gain value based on the first and second calibration values, and offset circuitry adjustable to set an offset value equal to the first calibration value, wherein the gain and offset values define the input range.

9. The device of claim 7 wherein the circuitry comprises an analog-to-digital converter (ADC) having a first reference terminal to receive the first calibration value as a first reference and a second reference terminal to receive the second calibration value as a second reference, the first and second references defining the input range.

10. The device of claim 1 wherein the driver comprises a voice coil driver and the sensor comprises a magnetic field sensor.

11. The device of claim 1 wherein the calibration information is produced when the first circuitry detects a power on cycle.

12. A system comprising:
 a controller; and
 a motion control device, coupled to the controller and a voice coil motor (VCM), comprising:
 a voice coil driver and a magnetic field sensor;
 first circuitry, coupled to the voice coil driver and the magnetic field sensor, to control the voice coil driver and magnetic field sensor to produce calibration information for the VCM;

second circuitry, coupled to the first circuitry, to adjust an input of the second circuitry relative to an input range that is based on the calibration information; and wherein the adjusted input is usable to produce a drive signal to drive the VCM.

13. The system of claim 12 wherein the calibration information comprises a first calibration value corresponding to a start-of-travel position value output by the magnetic field sensor when the voice coil driver provides no current to the VCM and a second calibration value corresponding to an end-of-travel position value output by the magnetic field sensor when the voice coil driver provides to the VCM a current capable of producing a maximum position change.

14. The system of claim 13 wherein the second circuitry comprises an input interface to receive an input request as the input and the first circuitry comprises a calibration control block that provides the first and second calibration values to the input interface.

15. The system of claim 14 wherein the input request comprises a digital value, and wherein the input interface comprises a digital-to-analog converter (DAC) having a first reference terminal to receive the first calibration value as a first reference and a second reference terminal to receive the second calibration value as a second reference, the first and second references defining the input range.

16. The system of claim 14 wherein the input request comprises an analog signal, and wherein the input interface comprises an operational amplifier having gain circuitry adjustable to set a gain value based on the first and second calibration values, and offset circuitry adjustable to set an offset value equal to the first calibration value, wherein the gain and offset values define the input range.

17. The system of claim 12 wherein the controller is configured to use the motion control device to focus the lens of a camera.

18. The system of claim 12 wherein the voice coil driver, the magnetic field sensor, the first circuitry and the second circuitry are integrated as a semiconductor integrated circuit.

19. The system of claim 18 wherein the semiconductor integrated circuit and the controller reside on a camera lens focusing module.

20. A method of controlling a motor, comprising:
controlling a driver and sensor to produce calibration information for the motor;
receiving as an input a request, produced by a controller, to select a position of the motor;
adjusting the input relative to an input range that is based on the calibration information; and
using the adjusted input to produce a drive signal to drive the motor.

21. The method of claim 20, wherein the calibration information comprises a first calibration value and a second calibration value, and wherein controlling comprises:
controlling the sensor to measure as the first calibration value a start-of-travel position value produced when the driver provides no current to the motor; and
controlling the sensor to measure as the second calibration value an end-of-travel position value produced when the driver provides to the motor a current capable of producing a maximum position change.

* * * * *

UNITED STATES PATENT AND TRADEMARK OFFICE
CERTIFICATE OF CORRECTION

| | |
|---|---|
| PATENT NO. | : 7,936,144 B2 |
| APPLICATION NO. | : 12/139539 |
| DATED | : May 3, 2011 |
| INVENTOR(S) | : Ravi Vig et al. |

It is certified that error appears in the above-identified patent and that said Letters Patent is hereby corrected as shown below:

Col. 2 line 44, delete "(position)." and replace with --(position);--.

Col. 7 line 2, delete ", such" and replace with --, such as a--.

Col. 10 line 4, delete "receives its" and replace with --receives as its--.

Signed and Sealed this
Sixth Day of September, 2011

David J. Kappos
*Director of the United States Patent and Trademark Office*